United States Patent [19]

Gontowski, Jr.

[11] Patent Number: 5,142,217
[45] Date of Patent: Aug. 25, 1992

[54] SYNCHRONIZABLE POWER SUPPLY CONTROLLER AND A SYSTEM INCORPORATING THE SAME

[75] Inventor: Walter S. Gontowski, Jr., Thompson, Conn.

[73] Assignee: SGS-Thomson Microelectronics, Inc., Carrollton, Tex.

[21] Appl. No.: 665,813

[22] Filed: Mar. 7, 1991

[51] Int. Cl.⁵ .............................. G05F 1/46
[52] U.S. Cl. ................... 323/272; 307/269; 331/55; 363/71
[58] Field of Search .......... 363/71, 72; 323/272, 323/288; 331/55; 307/269

[56] References Cited

U.S. PATENT DOCUMENTS

| | | | |
|---|---|---|---|
| 4,171,517 | 10/1979 | Higa et al. | 307/265 |
| 4,386,311 | 5/1983 | Bafaro | 363/71 |
| 4,532,435 | 7/1985 | Wood | 307/265 |
| 4,694,388 | 9/1987 | Losel | 363/72 |
| 4,825,144 | 4/1989 | Alberkrack et al. | 323/272 |

OTHER PUBLICATIONS

Deichmann, "External Synchronization of SGS-Thomson Switching Regulators: L296, L4960, L4962, L4964" (SGS-Thomson Microelectronics, Inc.).

Unitrode Linear Integrated Circuits Data and Application Handbook (1990), pp. 9-108, 9-109, 9-139-144.

Primary Examiner—William H. Beha, Jr.
Attorney, Agent, or Firm—Rodney M. Anderson; Lisa K. Jorgenson; Richard K. Robinson

[57] ABSTRACT

A pulse width modulated power supply controller is disclosed which is capable of generating synchronization pulses in such a manner that multiple ones of such power supply controllers in a system are synchronized to the controller having the highest oscillation frequency, without requiring one of the controllers to be implemented as a master and the others implemented as slaves. The power supply controller includes two comparators which are coupled to receive the external capacitor voltage. A first comparator enables a fast charging circuit, such as a current source, for increasing the rate at which the capacitor is charged responsive to the capacitor voltage reaching a first threshold; a single-ended or differential synchronization pulse is also generated, and communicated to the first comparators of other power supply controllers in a multiple controller system. The second comparator, which includes hysteresis in its characteristic, turns off the fast charging circuit at the upper threshold and initiates the discharge of the capacitor. Control of the output and masking of the comparators of the controllers is also based on the operation of the first and second comparators.

20 Claims, 4 Drawing Sheets

SYNCHRONIZABLE POWER SUPPLY CONTROLLER AND A SYSTEM INCORPORATING THE SAME

This invention is in the field of regulated power supplies and systems utilizing the same, and is more particularly directed to regulator circuits.

BACKGROUND OF THE INVENTION

In complex modern electronic systems, such as computer and control systems, the provision of regulated power supply voltages to the circuits in the system is a necessity in order to ensure optimal system performance. A conventional technique, particularly useful for modular systems, is to provide multiple regulated power supplies. Such a modular approach allows for the addition of another functional module, such as an add-on board for a computer system, with only the addition of its own regulated power supply of the appropriate size. In this way, module additions may be made in virtually unlimited fashion, without concern that a single master power supply will be overloaded by the addition of an incremental module. Overall system reliability may also be enhanced according to this concept by providing n+1 regulated power supplies for n modules, thus providing a spare regulated power supply in the event of failure of a power supply failure or an overload condition.

A widely-used type of power supply controller is the pulse-width-modulated (PWM) controller. As is well known, PWM power supply controllers provide, at their outputs, a series of pulses of varying pulse width according to the difference between a feedback signal corresponding to the actual power supply voltage (as applied to the load) and the reference voltage at which the voltage is to be regulated (i.e., the commanded level). Two modes of PWM power supply control are conventionally used, namely voltage mode and current mode.

Voltage mode PWM power supply control is accomplished by comparing the output power supply voltage to a reference level, generating an error signal corresponding to the difference therebetween. The error signal is then compared against an oscillating sawtooth signal from a free-running R-C oscillator, resulting in a PWM square wave which is applied to the output. Examples of voltage mode PWM power supply controllers include the L296, L4960, L4962 and L4964 switching regulators manufactured and sold by SGS-Thomson Microelectronics, Inc. Current mode PWM power supply control is accomplished by sensing the current supplied by the power supply controller to the load (generally the primary of a transformer), comparing it against the commanded level, and toggling a series of latches according to the comparison at a frequency established by an R-C oscillator. Examples of current mode PWM power supply controllers include the UC1842/2842/3842 series of controllers manufactured and sold by SGS-Thomson Microelectronics, Inc., and the UC3825 controller manufactured and sold by Unitrode. In each of the voltage and current mode cases, the R-C time constant of the oscillator is generally defined by an external R-C network connected to the appropriate terminals of the controller. While both modes of PWM power supply control are useful, current mode control is preferable for many systems, as the output current from each of the multiple power supply controllers in the system can be easily shared.

In the case of a system having multiple current mode PWM power supply controllers, synchronization of the power supply controllers is highly desirable. Since the controller outputs are pulses, a significant amount of electromagnetic interference is generated from output switching transients. It is well known that if the multiple power supply controllers are synchronized with one another, the frequencies of the switching noise are limited so that the noise can be readily filtered.

Multiple PWM power supply controllers can be synchronized with one another by synchronizing, in frequency and phase, the oscillators of each of the controllers As noted above, voltage mode PWM controllers each include an oscillator for generating the sawtooth input to the comparator, and current mode PWM controllers each generally include an oscillator for setting the frequency of the PWM output. Prior synchronization techniques include the definition of a master signal (generated either by one of the oscillators or by an external source), and running all, or all but one, of the oscillators in a slaved fashion thereto.

An externally generated signal is one obvious form of a master signal which, when applied to each of the PWM controllers, can control the operation of each of the oscillators therein. For example, an externally generated sawtooth signal may be directly applied to the comparators of each of the multiple voltage mode PWM controllers. However, since in many voltage mode PWM controllers (e.g., the L296 and L4964 switching regulators) the internal oscillators must be disabled when run by an external signal, loss of the external signal renders the controllers inoperable. In addition, complex additional circuitry is required in such a scheme. In some PWM controllers (e.g., the L4960 and L4962 switching regulators), the internal oscillator cannot be disabled when an external signal is applied, in which case prior schemes have used an external synchronization signal to maintain synchronization. The external sync signal must be carefully designed, however, so that multiple pulses are not generated (as occurs when the external frequency is too low) nor is the internal oscillator defeated (as occurs when the external frequency is too high).

According to another prior synchronization technique, the oscillators of multiple PWM controllers are coupled together, with one of the controllers serving as the master and the others as slaves. A typical method of setting up master and slave controllers is to operate one controller (i.e., the master) at a higher frequency than that at which the others (slaves). Connection of the synchronization terminals of the master and slave controllers to one another will allow the master controller to dominate the slave controllers and control the operation of all of the controllers in the system.

This master and slave configuration limits the design and manufacture of multiple power supply systems in certain ways, however. First, since the master and slave controllers are preferably of different types, (i.e., different operating specifications), both types of controllers must be maintained in manufacturing inventory, complicating production of the system. Secondly, it is essential in such arrangements that the oscillator frequencies of the master and slave controllers do not overlap, as otherwise the slave oscillators can generate extra pulses. This requires the timing components in the system to be of twice the precision otherwise necessary, and also requires that the operation of one or both of the controllers be held back from its full performance specifications to account for frequency tolerance limits of the slave controller (on the order of ±10%), each of these effects resulting in the use of more costly components than otherwise necessary for given system specifications. In addition, these prior master/slave arrangements have limited fan-out and thus the number of slave controllers allowed is limited. These arrangements can also be quite susceptible to false triggering caused by ground noise, which adds jitter to the regulated power supply output.

It should also be noted that the master/slave arrangement is also vulnerable to the failure of the master controller, in which case the synchronization of the slave controllers will be lost (or, alternatively, the slave controllers will be inoperable). Accordingly, the desired redundancy noted hereinabove is not fully achievable using this arrangement.

It is therefore an object of this invention to provide a power supply controller which provides for automatic synchronization in a multiple power supply scheme.

It is a further object of this invention to provide a system incorporating multiple ones of such controllers.

It is a further object of this invention to provide such a system which synchronizes all controllers to the fastest oscillator presently in the system.

It is a further object of this invention to provide such a system where all of the controllers in the system are of the same type.

It is a further object of this invention to provide such a system which provides a single-ended synchronization pulse to all controllers.

It is a further object of this invention to provide such a system which provides a differential synchronization signal for improved noise immunity.

Other objects and advantages of this invention will be apparent to those of ordinary skill in the art having reference to the following specification together with its drawings.

SUMMARY OF THE INVENTION

The invention may be incorporated into a pulse width modulated (PWM) controller which includes an oscillator which generates a synchronization pulse and a higher charging current upon the oscillator voltage reaching a first threshold level. The synchronization pulse may be communicated to other similar controllers in the system; if so, the first oscillator to generate the synchronization pulse will cause the other controllers to synchronize with it. As a result, the controller with the highest free-running oscillator frequency will control the operation of the other controllers in the system. The synchronization pulse also is used internally within each controller to disable the output and to mask the comparator during the synchronization period, so that jitter is reduced. The synchronization pulse may be either single-ended or differential.

DETAILED DESCRIPTION OF THE PREFERRED EMBODIMENTS

Figure 1:
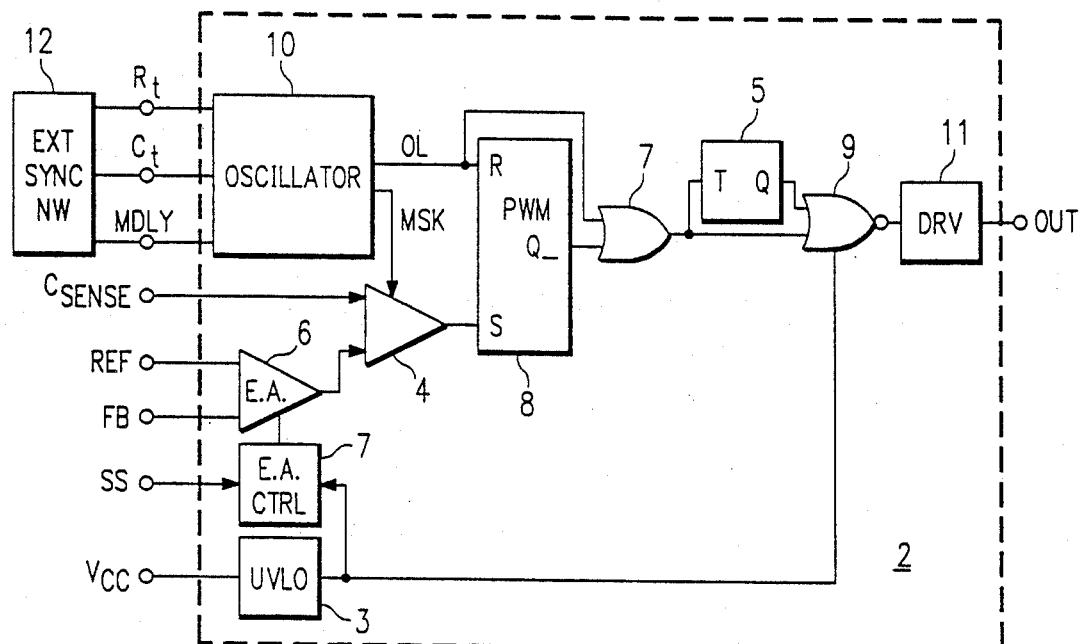
FIG. 1 is an electrical diagram, in block form, of a current mode PWM power supply controller according to a first embodiment of the invention.

Referring now to FIG. 1, a current mode PWM power supply controller 2 constructed according to a first embodiment of the invention will be described. It should be noted that while the invention is particularly useful for current mode controllers such as controller 2, the synchronization techniques described herein are equally applicable to voltage mode PWM power supply controllers. In addition, it should be noted that each embodiment of the controllers described herein is preferably manufactured as a single integrated circuit, for purposes of low cost and close component parameter matching.

Controller 2 is constructed substantially in the conventional manner for current mode PWM power supply controllers, such as the UC1842/2842/3842 series of controllers manufactured and sold by SGS-Thomson Microelectronics, Inc., and the UC3825 controller manufactured and sold by Unitrode, with the particular exception of oscillator 10 and its control of the output and comparison, as will be described in further detail hereinbelow. Controller 2 thus includes a comparator 4, which compares a voltage received at terminal CSENSE to the output of error amplifier 6. The voltage at terminal CSENSE, as is also conventional for current mode PWM controllers, is a voltage taken across a small sensing resistor connected in series between the output terminal OUT of controller 2 and the load applied thereto, which is generally the primary coil of a transformer. As such, comparator 4 receives a signal at one input corresponding to the current provided at the output terminal OUT of controller 2.

Error amplifier 6 is a differential amplifier which presents an output corresponding to the differential between a reference level received at terminal REF (or, alternatively, generated on-chip based on a reference voltage applied to controller 2) and a feedback voltage applied to terminal FB, which is based on the output of controller 2 as is conventional for current mode PWM controllers 2. It should be noted that some conventional current mode PWM controllers include passive components for adjusting the output of error amplifier 6 to levels suitable for comparison by comparator 4. The commanded level generated by error amplifier 6 and applied to comparator 4 is a reference value against which the sensed output current is compared.

It should be noted that error amplifier 6 is also preferably controlled according to certain additional well-known functions in the art, illustrated by error amplifier control circuit 7. For example, terminal SS may be connected to an external capacitor in the conventional manner to provide a "soft-start" time constant prior to enabling error amplifier 6; such a soft-start function allows for the output current to ramp up at a controlled rate as it begins to power up its load, thus avoiding large power-up transients. Undervoltage lockout circuit 3 also provides an input to error amplifier control circuit 7, to disable error amplifier 6 if the input voltage received at terminal $V_{cc}$ is below a certain lower limit; undervoltage lockout circuit 3 also disables the output of controller 2 (by disabling NOR gate 9) during this time. These, and other, additional features not shown are conventional for current mode PWM power supply controllers in the art and may be included in controller 2.

The output of comparator 4 is coupled to the set input of PWM flip-flop 8, which is a conventional R-S flip-flop (set dominant). The reset input of PWM flip-flop 8 receives a signal on line OL from oscillator 10. Oscillator 10 is coupled to an external passive network which determines its frequency of oscillation, as will be described in further detail hereinbelow. A control line MSK from oscillator 10 is connected to a control input of comparator 4, such that oscillator 10 controls whether or not comparator 4 is enabled (in this example, comparator 4 is enabled with a high level on line MSK), as will also be described in further detail hereinbelow.

OR gate 7 receives the Q_ output from PWM flip-flop 8 at one input, and the reset signal on line OL at its other input. The output of OR gate 7 is connected to the T input of toggle flip-flop 5, and to an input of NOR gate 9; the other input to NOR gate 9 receives the Q output from T flip-flop 5. The output of NOR gate 9 controls push-pull driver 11, the output of which is presented at output terminal OUT. It should be noted that, as is conventional for some current mode PWM power supply controllers, multiple parallel push-pull drivers 11 may be provided, each of which drive a separate output terminal.

Figure 2:
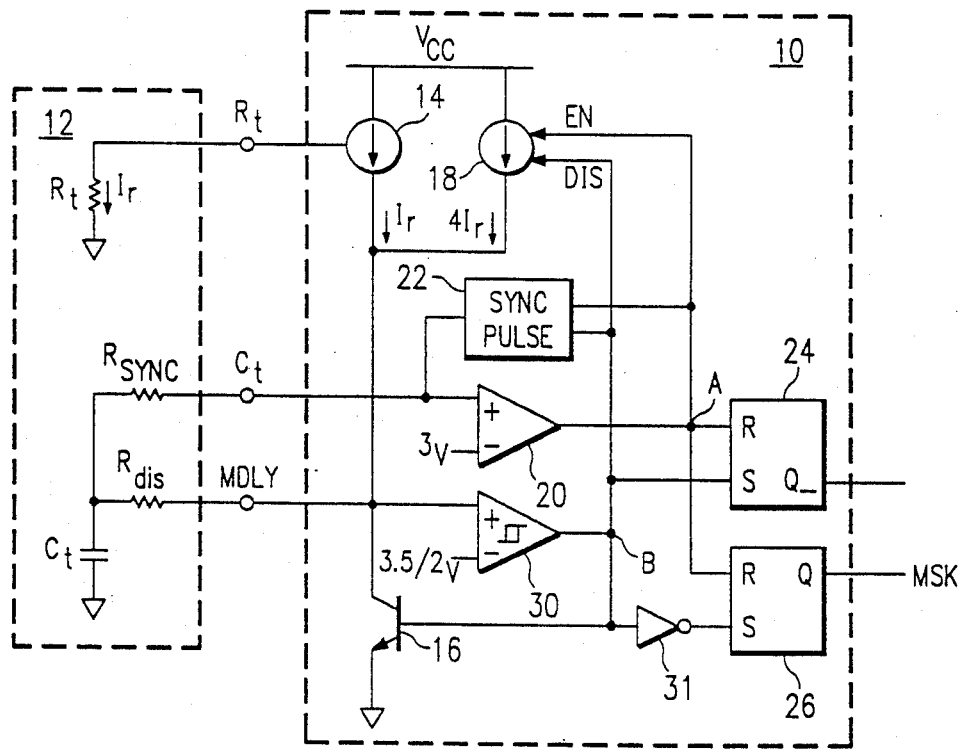
FIG. 2 is an electrical diagram, in schematic form, of the oscillator of the controller of FIG. 1.

Referring now to FIG. 2, the construction of oscillator 10, in conjunction with external network 12, according to this first embodiment of the invention will now be described in detail. External network 12 includes a resistor $R_t$ which is connected between ground and the $R_t$ terminal of controller 2, a capacitor $C_t$ which has one plate connected to ground and has its other plate connected to terminal MDLY of controller 2 and to a series resistor $R_{sync}$ which is connected to terminal $C_t$ of controller 2. The product of the values of capacitor $C_t$ and resistor $R_t$ determine the charging time constant of the oscillation of oscillator 10, in the conventional manner. Series resistor $R_{sync}$ is a relatively small resistor (for example on the order of 5Ω).

Terminal $R_t$ is connected to current source 14, which is biased from the power supply $V_{cc}$ and which has its output connected to terminal MDLY and to the collector of transistor 16. Current source 14 is preferably a current mirror, so that it sources a current $I_R$ from its output to terminal MDLY which matches the current $I_R$ out of terminal $R_t$ through resistor $R_t$ to ground. Such current mirror circuits are well known in the art.

A second current source 18 is also biased from power supply node $V_{cc}$, and has its output connected to terminal MDLY and the collector of transistor 16. Current source 18 is a conventional current source which is controlled by enable and disable inputs, to source a current which is a multiple of the current $I_r$ when enabled, for example a current $4I_R$. When disabled, current source 18 presents a high impedance to terminal MDLY.

Terminal $C_t$ is connected to the non-inverting input of comparator 20, which is a conventional comparator. The inverting input of comparator 20 is coupled to a regulated voltage which sets the first threshold voltage of the oscillator as will be described in further detail hereinbelow. This regulated voltage, in this example approximately 3 volts, is preferably generated from the regulated output from controller 2. The output of comparator 20, at node A, is coupled to the enable input of current source 18, to an input of sync pulse circuit 22, and to the reset inputs of output latch 24 and mask latch 26. In this example, for the logical conventions used herein, output latch 24 drives line OL with its Q_ output and mask latch 24 drives line MSK with its Q output.

Terminal MDLY is connected to the non-inverted input of comparator 30. Comparator 30 is preferably a conventional comparator which has hysteresis in its transfer characteristic; a well-known example of such a comparator is a Schmitt trigger. The inverting input of comparator 30, as in the case of comparator 20, receives a regulated voltage. The regulated voltage applied to the inverting input of comparator 30 is selected so that the trigger voltage for a rising edge at the non-inverting input is greater than the threshold voltage of comparator 20, for example approximately 3.5 volts, and so that the trigger voltage for the falling edge at the non-inverting input is less than the threshold voltage of comparator 20, for example approximately 2.0 volts. The output of comparator 30, at node B, is connected to the disable input of current source 18, to a second input of sync pulse circuit 22, to the set inputs of output latch 24 and (via inverter 31) mask latch 26, and to the base of transistor 16. Transistor 16 has its emitter coupled to ground.

Sync pulse circuit 22 is for generating a high level pulse at terminal MDLY during such time as the voltage $V_{ct}$ at capacitor $C_t$ is above the threshold voltage of comparator 20, but below the upper hysteresis threshold voltage of comparator 30. Accordingly, sync pulse circuit 22 may consist of a logic function (in this embodiment, the logical AND of node A at a high logic level and node B at a low logic level), and provide sufficient drive current to not only pull terminal $C_t$ high but also, as will be described hereinbelow, a number of terminals $C_t$ associated with other controllers 2 in the same system. An example of such a driver is an emitter follower circuit, configured to be responsive to the logical combination of nodes A and B.

Figure 3:
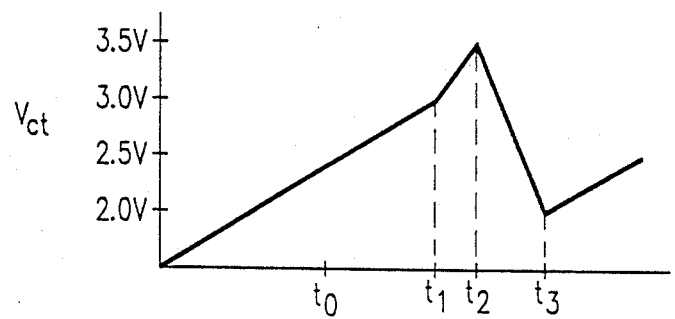
FIG. 3 is a timing diagram illustrating the operation of the oscillator of FIG. 2.
Figure 3:
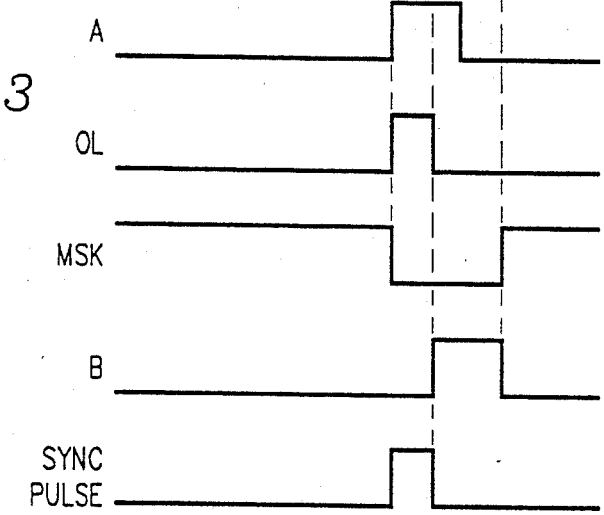

Referring now to FIG. 3, the operation of oscillator 10 will now be described, beginning during the charging portion of the cycle. At time $t_0$, the voltage $V_{ct}$ at capacitor $C_t$ is above the lower hysteresis threshold of comparator 30, but less than the threshold of comparator 20. Accordingly at this time, nodes A and B are both low, so that sync pulse circuit 22, current source 18, and transistor 16 are all off. According to the logical conventions in this example of the invention, line OL at the Q_ output of output latch 24 is low and line MSK at the Q output of mask latch 26 is high, as each of latches 24, 26 have last been set and are not yet reset.

With current source 18 and transistor 16 off, current mirror 14 charges capacitor $C_t$ with the current $I_R$ through terminal MDLY. In addition, referring to FIG. 1 in combination with FIGS. 2 and 3, at time $t_0$ during the charging time of capacitor $C_t$, line OL is low so that PWM latch 8 responds to the output of comparator 4, and line MSK is high so that comparator 4 responds to the current sense input at line CSENSE relative to the commanded level at the output of error amplifier 6. Responsive to the output of comparator 4 indicating that the sensed current is below the commanded level, a pulse is fed to PWM latch 8 to set the Q output thereof, causing the output of NOR gate 9 to enable push-pull driver 11 to generate a pulse at terminal OUT. This pulse will be maintained until the earlier of such time as the current from terminal OUT is sufficient (i.e., the voltage at terminal CSENSE reaches the commanded level) or as line OL goes high, as will now be described relative to FIGS. 2 and 3.

At time $t_1$, voltage $V_{ct}$ of capacitor $C_t$ has reached the threshold voltage of comparator 20, which in this case is approximately 3.0 volts. It should be noted that the small size of resistor $R_{sync}$ relative to the high impedance of the non-inverting input of comparator 20 effectively presents the full capacitor voltage to comparator 20. Upon voltage $V_{ct}$ exceeding the threshold level of comparator 20, a high level is driven by comparator 20 at node A. The high level on node A resets both output latch 24 and mask latch 26. As a result, PWM latch 8 of FIG. 1 is reset, and the high logic level on line OL is communicated to toggle latch 5, NOR gate 9, and driver 11, ending the pulse at output terminal OUT. In addition, the resetting of mask latch 26 causes a low logic level to be driven on line MSK, disabling comparator 4.

The disabling of PWM latch 8 and comparator 4 at this point in the cycle provides significant advantages in the operation and stability of controller 2 according to this embodiment of the invention. As in conventional current mode PWM controllers, the frequency of the pulse width modulated output is thus controlled by an internal oscillator (i.e., comparator 20 and capacitor $C_t$). Disabling of comparator 4 at this time by the low logic level on line MSK additionally provides immunity to ground noise and other noise in the system which can cause false triggering. This is particularly useful in this embodiment of the invention, since synchronization of all controllers in the system is effected at this point in the cycle (as will be described hereinbelow). Such synchronization necessarily generates some amount of switching transients in the system; the disabling of comparator 4 during this time ensures that false triggering due to this noise, and the transients caused by the ending of the pulse at output terminal OUT, do not occur.

Also as node A goes to a high level at time $t_1$, current source 18 is enabled. The enabling of current source 18 increases the current charging capacitor $C_t$ from the level $I_R$ determined by the value of resistor $R_t$, to a significantly higher level, for example $5I_R$. Accordingly, the charging time constant is now significantly reduced, by a factor of five in this example, as shown in the slope of $V_{ct}$ in FIG. 3.

In addition, sync pulse circuit 22 is enabled to generate a pulse at terminal $C_t$, on the other side of resistor $R_{sync}$ from capacitor $C_t$, of sufficient magnitude as to substantially match the increasing rise in the voltage at capacitor $C_t$. Resistor $R_{sync}$ allows this pulse to immediately appear at terminal $C_t$, as the switching speed of the pulse would be limited if applied directly to capacitor $C_t$. Sync pulse circuit 22 is particularly useful in the synchronization of additional controllers having oscillators similar or identical to oscillator 10 in controller 2. The synchronization of multiple controllers 2 in a system will now be described relative to FIGS. 4 and 5.

Figure 4:
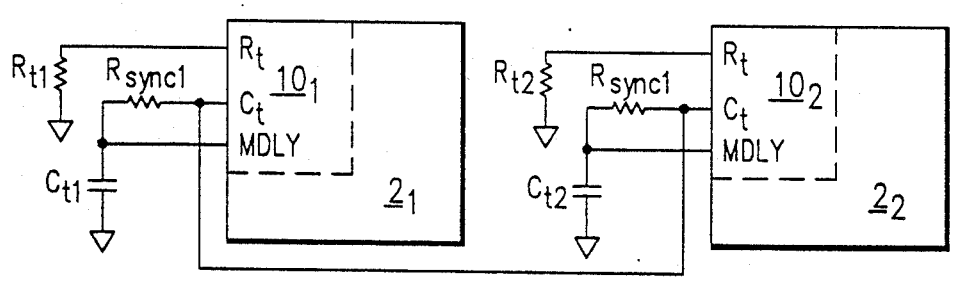
FIG. 4 is an electrical diagram, in block form, of a system having multiple controllers of FIG. 1.

FIG. 4 illustrates a system having two controllers $2_1$ and $2_2$ for producing regulated power; additional controllers 2 in the system will be synchronized in the same manner, and accordingly it is contemplated that this description of the synchronization of two controllers 2 is sufficient to describe the synchronization of many. Controllers $2_1$ and $2_1$ each are constructed as described hereinabove relative to FIG. 1, with oscillators 10 therein constructed as described hereinabove relative to FIG. 2. Each of controllers $2_1$ and $2_2$ have an external network of resistors $R_t$ and $R_{sync}$ and capacitor $C_t$ connected thereto in the same manner as described hereinabove relative to FIG. 2. The values of the passive components are preferably nominally the same for each external network 12.

As noted hereinabove, upon voltage $V_{ct}$ reaching the threshold level of comparator 20 in controller $2_1$ at time $t_1$, node A in controller 2 is driven to a high logic level, causing a pulse to be applied by sync pulse circuit 22 to its terminal $C_t$ and thus to the terminals $C_t$ of controller $2_2$ (and any other controllers 2 in the system which are connected thereto). In the system of FIG. 4, the controller 2 having the higher oscillator frequency (i.e., the lowest charging time constant) will reach this threshold level earlier in each cycle. For example, if controller $2_1$ has a smaller time constant than controller $2_2$, its voltage $V_{ct1}$ will reach the threshold value before the capacitor voltage $V_{ct2}$ does so, as shown in the timing diagram of FIG. 5. Sync pulse circuit 22 in controller $2_1$ thus generates the sync pulse at its terminal $C_t$ of sufficient drive capability to cause the voltage $V_{ct2}$ at terminal $C_t$ of controller $2_2$ to exceed the threshold level of its comparator 20. The same will occur for all other controllers 2 in the system having its terminal $C_t$ connected in common with that of controller 2. Comparator 20 in controller $2_2$ will now drive a high level at its output node A responsive to the pulse at the output of sync pulse circuit 22 of controller $2_1$. The additional current sources 18 in each of the controllers 2 in the system are enabled to provide increased charging current to the respective capacitors $C_t$ in a synchronized manner.

It should be noted that the synchronization illustrated in FIG. 4 will repeat in each oscillator cycle, with the highest frequency controller 2 reaching its threshold frequency first and generating the sync pulse to trip the comparator 20 in each of the other controllers 2 in the system. As this is done during each oscillator cycle, a system having multiple controllers 2 is less vulnerable to failure of the highest frequency power supply controller 2, as the next higher frequency controller 2 can generate the sync pulse first with its sync pulse generator circuit 22 in succeeding cycles, with all of the other controllers 2 in the system synchronizing thereto.

Referring back to FIGS. 2 and 3, the operation of oscillator 10 in controller 2 (and in the other controllers 2 in the system) for the remainder of the oscillator cycle will now be described. At time $t_2$, the voltage $V_{ct}$ has reached the upper hysteresis threshold of comparator 30, which in this example is 3.5 volts, and comparator 30 drives node B at its output to a high logic level responsive thereto. Node B at a high level disables current source 18 so as to present a high impedance to the node at terminal MDLY. In addition, a high level at node B turns off sync pulse circuit 22, ending the sync pulse at terminal $C_t$.

The high level at node B is presented to the set input of output latch 24. This high level causes the Q_ output to go to a low logic level which re-enables PWM latch 8 to respond to the output of comparator 4. Due to the presence of inverter 31, however, the set input of mask latch 26 does not receive a rising edge, so line MSK continues to disable comparator 4 during this time.

Also at this time, capacitor $C_t$ begins to discharge due to the high level at node B turning on transistor 16. Since the top plate of capacitor $C_t$ is coupled, via terminal MDLY, to the collector of transistor 16 which presents a very low series resistance to ground, capacitor $C_t$ discharges much more quickly than it charged up. As capacitor $C_t$ discharges below the threshold of comparator 20, node A returns to a low level, in preparation for the next cycle. At time $t_3$, capacitor $C_t$ has been discharged to the lower hysteresis threshold of comparator 30, which in this case is approximately 2.0 volts.

Upon voltage $V_{ct}$ reaching the lower hysteresis threshold of comparator 30 at time $t_3$, comparator 30 again drives its output at node B low. This turns off transistor 16, allowing capacitor $C_t$ to again be charged up from current mirror 14. In addition, the high-to-low transition at node B is communicated via inverter 31 to the set input of mask latch 26, causing the Q output thereof and line MSK to go to a high level, enabling comparator 4 in controller 2. The cycle thus begins again.

It should be noted that a small resistor $R_{dis}$, having a value on the order of $5\Omega$ to $10\Omega$ may be placed in series between the upper plate of capacitor $C_t$ and terminal MDLY to increase the discharging time constant of capacitor $C_t$ and thus to increase the time during which comparator 4 is masked (by increasing the time between times $t_2$ and $t_3$ in FIG. 3). This relatively small resistor $R_{dis}$, similarly as resistor $R_{sync}$ in series with the non-inverting input of comparator 20, will not affect the switching thresholds of comparator 30. Such a resistor $R_{dis}$, however, will have a strong effect on the discharging time constant, as the collector-emitter on-resistance of transistor 16 is quite low. The discharging time constant of capacitor $C_t$ may, in this way, be adjusted depending upon the noise characteristics of the system, and the level of noise immunity of comparator 4.

Figure 5:
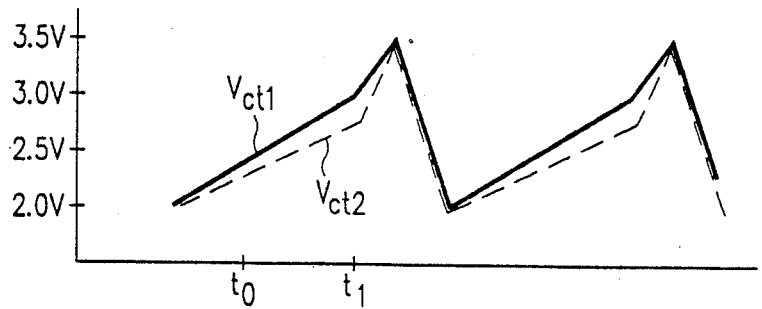
FIG. 5 is a timing diagram illustrating the synchronization of the controllers in the system of FIG. 4.

It should be noted, as illustrated in FIG. 5, that the slower controllers 2 in the system will again charge up with a larger time constant than the highest frequency controller 2. The generation of the sync pulse by sync pulse circuit 22 of the highest frequency controller 2 will repeatedly synchronize all controllers 2 in the system at the same time in each cycle, as described hereinabove. It should also be noted that the load presented to the output of sync pulse circuit 22 in the highest frequency controller 2 is relatively small, since the inputs of comparators 20 are of extremely high impedance, as is conventional for such comparators, and since the voltage drop across each of the resistors $R_{sync}$ is relatively small due to capacitors $C_t$ each being rapidly charged by current mirror 14 and current source 18 in tandem. Accordingly, the fanout of the effective "master" controller 2 is quite high.

Referring again to FIG. 1, once comparator 4 is enabled by line MSK returning low in controller 2, the sensed current level at terminal CSENSE is again compared against the commanded level from error amplifier 6. Since driver 11 has most recently been off, during the portion of the cycle during which line OL was low, the sensed current will generally be lower than the commanded level at this time. Comparator 4 will then issue a pulse to the set input of PWM latch 8, driving a low logic level at the Q_ output thereof, resulting in a high logic level at the output of NOR gate 9 to enable driver 11 to drive the output terminal OUT. Again, the pulse will be maintained at terminal OUT until the earlier of line OL going high or comparator 4 changing state. Accordingly, the pulse width modulated output drive is provided by controller 2 according to this embodiment of the invention.

Figure 6:
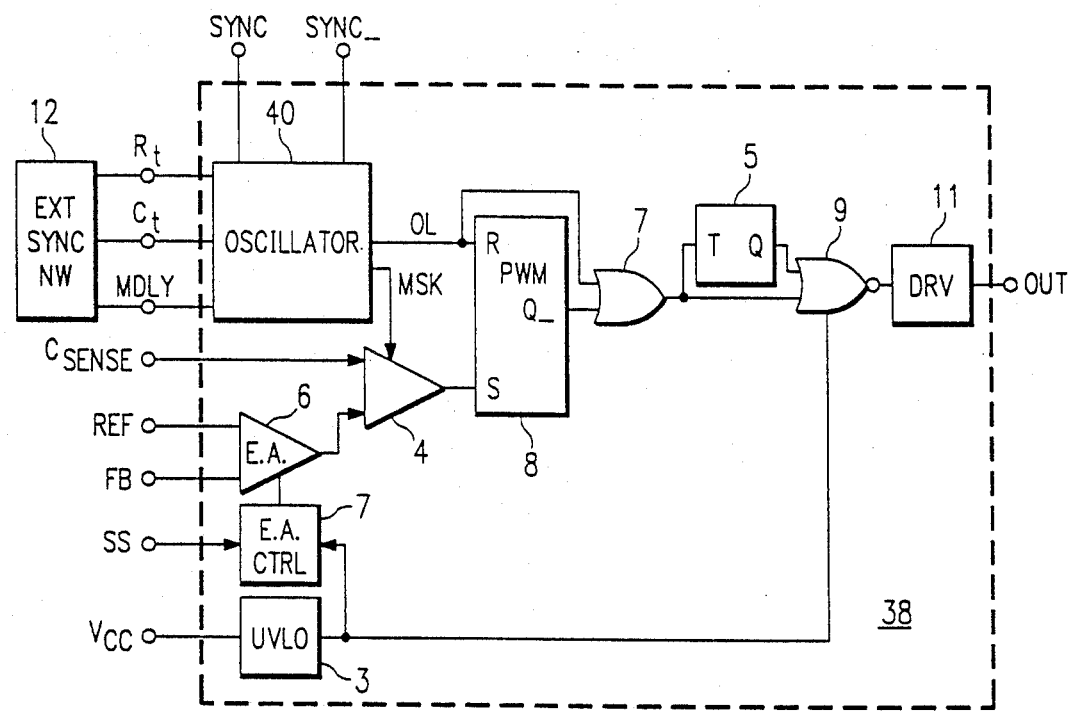
FIG. 6 is an electrical diagram, in block form, of a current mode PWM power supply controller according to a second embodiment of the invention.

Referring now to FIG. 6, controller 38 according to an alternative embodiment of the invention, in which a differential synchronization pulse synchronizes multiple current mode PWM controllers, will now be described. As is evident from FIG. 6, controller 38 is constructed similarly as controller 2 of FIG. 1, with the exception of additional terminals SYNC and SYNC_ via which oscillator 40 presents and receives differential synchronization signals to and from other controllers 38 in the system. According to this alternative embodiment of the invention, where multiple controllers 38 are provided in a system, the terminals SYNC of all controllers 38 will be connected in common, as will terminals SYNC_ of all controllers 38; no connection of terminals $C_t$ is necessary according to this embodiment of the invention.

Figure 7:
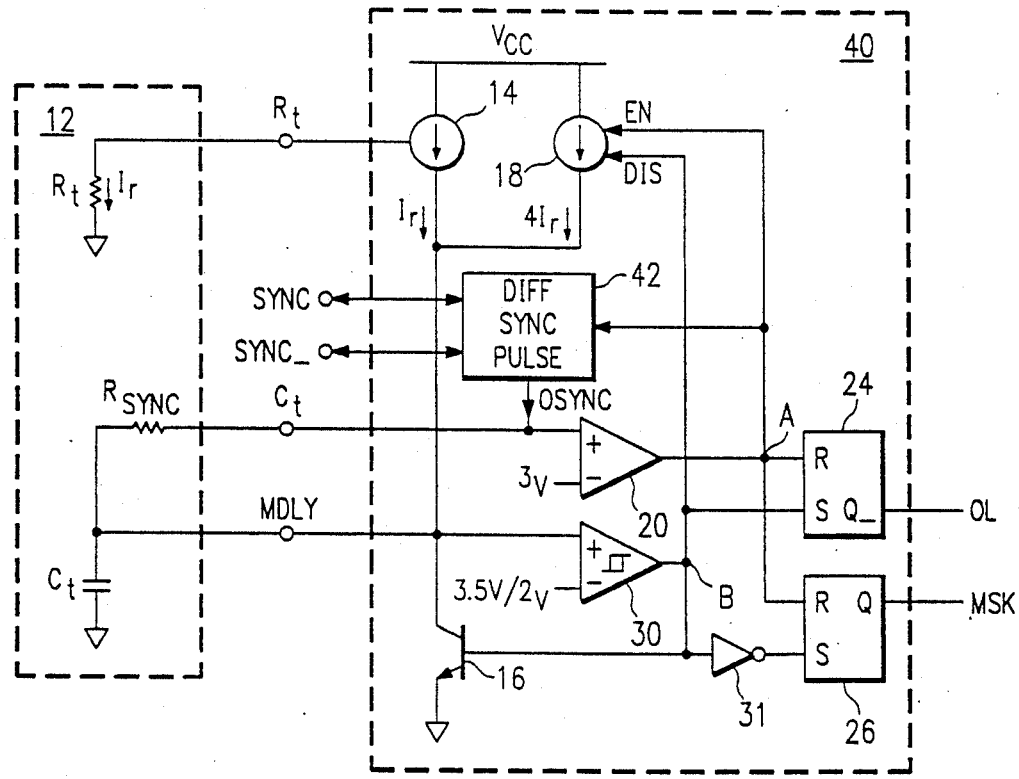
FIG. 7 is an electrical diagram, in schematic form, of the oscillator of the controller of FIG. 1.

Referring now to FIG. 7, the construction of oscillator 40 in controller 38 according to this embodiment of the invention will now be described in detail. Corresponding elements between oscillators 10 and 40 are referred to by the same reference numeral. As is evident from the Figures, the construction of oscillators 10 and 40 is quite similar, as is their operation, particularly relative to the charging and discharging of capacitor $C_t$, and the generation and control of signals on lines OL and MSK.

In place of sync pulse circuit 22, however, oscillator 40 includes differential sync pulse circuit 42. Sync pulse circuit 42 receives an input from node A, and presents an output on line OSYNC to the non-inverting input of comparator 20. In addition, sync pulse circuit 42 is connected to bidirectional terminals SYNC and SYNC_ for presenting and receiving differential synchronization signals thereat. As noted hereinabove, multiple controllers 38 according to this embodiment of the invention will have their SYNC and SYNC_ terminals, respectively, connected in common with one another.

Figure 8:
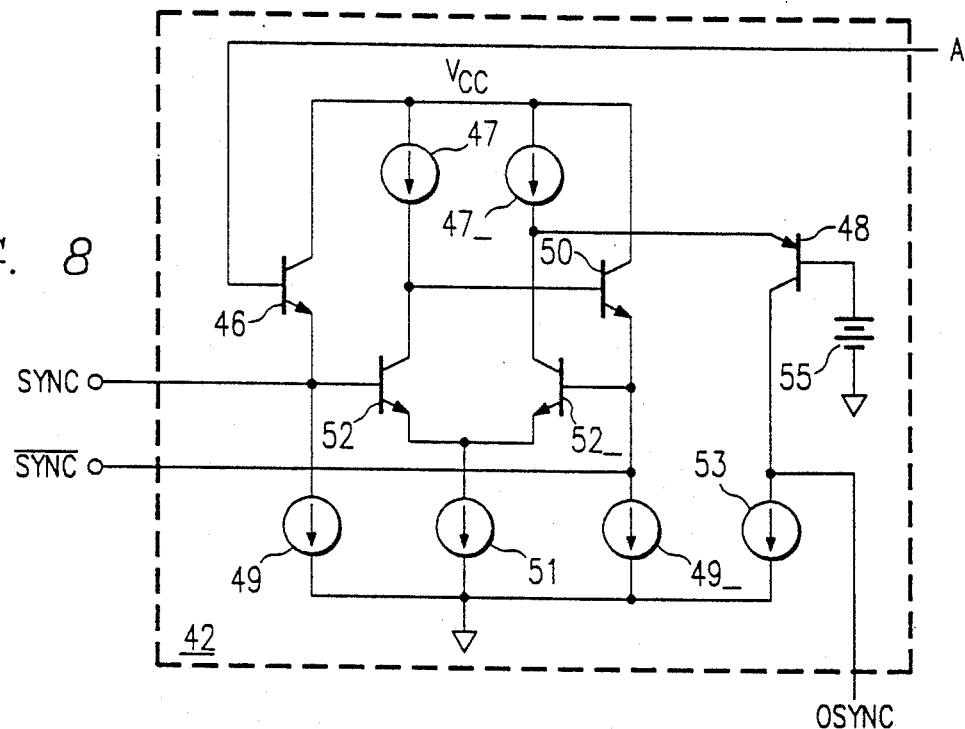
FIG. 8 is an electrical diagram, in schematic form, of the differential synchronization pulse circuit in the circuit of FIG. 7.

Referring now to FIG. 8, the construction and operation of sync pulse circuit 42 will now be described in detail. Node A is connected to the base of transistor 46. Transistor 46 has its collector biased by $V_{cc}$, and has its emitter coupled to ground through current source 49. On the opposite side of the circuit, transistor 50 has its collector biased to $V_{cc}$, and has its emitter coupled to ground via current source 49_; current sources 49 and 49_ are matched to one another, preferably configured as a current mirror. The parameters of transistors 46 and 50 are also preferably matched to one another. Terminals SYNC and SYNC_ are connected to the emitters of transistors 46 and 50, respectively.

Current sources 47 and 47_, also matched to one another, are coupled between $V_{cc}$ and the collectors of transistors 52 and 52_, respectively. Transistors 52 and 52_ are connected in emitter-coupled fashion to ground via current source 52. The bases of transistors 52 and 52_ are connected to terminals SYNC and SYNC_, respectively. In addition, the collector of transistor 52 is connected to the gate of transistor 50.

The output signal on line OSYNC is generated via transistor 48 which has its emitter connected to the collector of transistor 52_; transistor 48 is in common-base configuration to provide fast switching thereof. As such, the base of transistor 48 is biased by a regulated voltage 55, preferably generated from the output of controller 38. Current source 53 couples the collector of transistor 48 to ground, and line OSYNC is driven by the collector of transistor 48.

Figure 9:
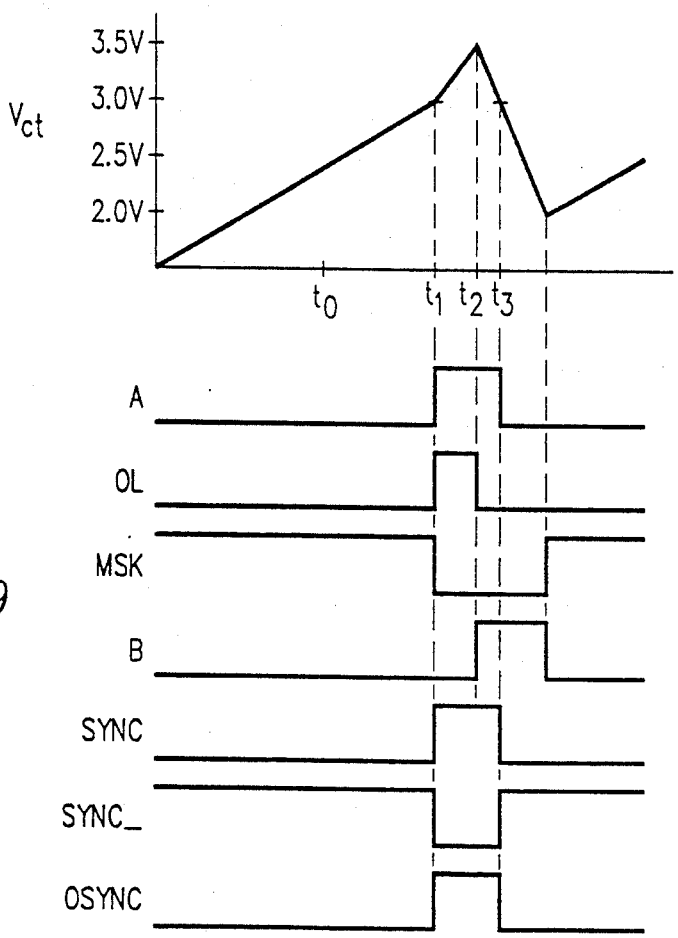
FIG. 9 is a timing diagram illustrating the operation of the oscillator of FIG. 7.

The operation of sync pulse circuit 42 will now first be described relative to its generation of the sync pulse signals at terminals SYNC and SYNC_. This mode of operation will occur in the case of a single controller 38 in a system, or in the case of the one of several controllers 38 having the highest oscillator frequency as described above relative to the system of FIGS. 4 and 5. Reference is also directed to FIG. 9, which is a timing diagram illustrating the operation of oscillator 40 in controller 38 according to this embodiment of the invention.

During the portion of the cycle in which capacitor $C_t$ is charging, node A is at a low logic level, as described hereinabove, maintaining transistor 46, in sync pulse circuit 42, off during this time. With transistor 46 off, current source 49 turns off transistor 52 and pulls terminal SYNC to a low level, as shown in FIG. 9. Since transistor 52 is off, the current from current source 47 turns on transistor 50, which in turn turns on transistor 52_ so that the current of current source 51 passes solely through transistor 52_, since transistor 52 remains off. The emitter follower configuration of transistor 50, turned on by current source 47, drives terminal SYNC_ to a voltage near $V_{cc}$, as shown in FIG. 9 at time $t_0$. In addition, since transistor 52_ is on, the current into the emitter of transistor 48 will be small, and thus current source 53 will discharge line OSYNC to a low level.

At time $t_1$, upon voltage $V_{ct}$ reaching the threshold of comparator 20, node A goes to a high logic level, turning on transistor 46, which turns on transistor 52 and turns off transistor 50. With transistor 46 on and transistor 50 off, terminal SYNC is driven to a high level, and terminal SYNC_ is driven to a low logic level, responsive to node A going high.

Transistor 52_ also turns off as transistor 52 is turned on, in the conventional emitter-coupled fashion. With both transistors 50 and 52_ off, the current from current source 47_ flows into the emitter of common-base configured transistor 48, with the collector current of transistor 48 exceeding that of current source 53. Line OSYNC is thus driven to a high level, driving terminal $C_t$ high to match the fast charging of capacitor $C_t$ from current source 18 which also results from node A going high.

The sync pulses at terminals SYNC, SYNC_ and OSYNC remain until such time as capacitor $C_t$ has been discharged below the threshold level of comparator 20, i.e., after comparator 30 has turned on transistor 16 through which capacitor $C_t$ discharges, at time $t_2$. Upon voltage $V_{ct}$ falling below the threshold level of comparator 20, at time $t_3$, transistor 46 turns off, resetting sync pulse circuit 42 to its prior state of terminal SYNC and line OSYNC both low and terminal SYNC_ at high. The differential synchronization pulse thus is complete.

For those controllers 38 in a multiple controller system which do not have the highest oscillator frequency, however, the synchronization pulse will be received at terminals SYNC and SYNC_ before their internal node A goes to a high level. The operation of sync pulse circuit 42 in such controllers 38, responsive to an externally presented differential synchronization signal at terminals SYNC and SYNC_ will now be described.

At the time that an external differential sync pulse is received, sync pulse circuit 42 is in the state described hereinabove for time $t_0$, with transistors 46, 48 and 52 off, and transistors 50 and 52_ on. The differential synchronization signal of a positive pulse received on terminal SYNC relative to terminal SYNC_ will cause the emitter-coupled pair to change state in the conventional fashion. With transistor 52 on, transistor 50 will be turned off. As in the prior case, with both transistors 50 and 52_ off, the current from current source 47_ is forced into the emitter of transistor 48, causing line OSYNC to be driven high.

A high level on line OSYNC, as in the case of the system of FIGS. 4 and 5, causes comparator 20 in controller 38 receiving the differential synchronization signal to drive its node A high. The functions of rapid charging of its external capacitor $C_t$, and of the resetting of latches 24 and 26 will occur, as will the remainder of the cycle as described hereinabove, in a synchronous manner with the controller 38 which issued the differential synchronization signal on its terminals SYNC and SYNC_.

An additional benefit of the differential synchronization scheme described hereinabove relative to FIGS. 6 through 9 is that common mode noise at synchronization terminals SYNC and SYNC_ will be rejected, and will not affect the operation of controller 38, due to the emitter-coupled pair of transistor 52 and 52_ receiving the signals at terminals SYNC and SYNC_. Such common mode noise is often prevalent in systems which have relatively long lead lengths between power supply controllers. Accordingly, the immunity of controller 38 to noise on the commonly connected synchronization terminals is improved.

In each of the embodiments described hereinabove, multiple power supply controller systems may be constructed which use identical power supply controllers, and without designing one of the controllers as the master and the others as slaves, as the controller with the highest inherent oscillator frequency will control the others, as described hereinabove. The manufacturing of such systems is thus facilitated, as inventory of separate controller types need not be maintained. Furthermore, the reliability of the system is improved, as the failure of the "master" controller will merely allow the next higher frequency controller to control the synchronization of the others, with no switching or other control of such synchronization required. In addition, the oscillator tolerances of those controllers which are slaves need not be taken into account, thus allowing the controllers to operate at the full extent of their performance specifications, thus preventing the need to purchase more costly components than are required by the system specifications.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A system comprising a plurality of power supply controllers, wherein each power supply controller comprises:
   a PWM comparator for comparing a feedback signal to a commanded level;
   a circuit for generating a pulse width modulated signal responsive to the output of said PWM comparator, and for applying the same to the output of the power supply controller;
   a capacitor; and
   an oscillator, comprising:
      a first comparator having an input coupled to a first terminal, for receiving a voltage thereat and for generating an output corresponding to the comparison of said voltage with a first threshold level, said first terminal coupled to said capacitor;
      a second comparator, having an input coupled to a second terminal for receiving a voltage thereat, and for generating an output corresponding to the comparison of the voltage at its input with second and third threshold level, said second comparator driving its output to a first state responsive to the voltage at its input exceeding said second threshold level and maintaining said first state until the voltage at its input falls below said third threshold level, said second threshold level being higher than said first threshold level, and said third threshold level being lower than said first threshold level, said second terminal also coupled to said capacitor;
      a charging circuit for applying charging current to said capacitor responsive to said first and second comparators in such a manner that said charging circuit is enabled responsive to the voltage at the input of said first comparator exceeding said first threshold level, and is disabled responsive to the output of said second comparator at said first state; and
      a pulse generator circuit, having an output coupled to the input of said first comparator, for generating a synchronization pulse responsive to the voltage at the input of said first comparator exceeding said first threshold level;
   wherein said power supply controllers are connected to one another in such a manner that said synchronization pulse generated by a first of said plurality of power supply controllers is received by a second of said plurality of power supply controllers.

2. The system of claim 1, wherein said pulse generator circuit applies said synchronization pulse to said first terminal responsive to the input of said first comparator exceeding said first threshold level, said synchronization pulse having a voltage above said first threshold level; and
   wherein said first terminals of said plurality of power supply controllers are connected to one another, such that the synchronization pulse applied by a first of said plurality of power supply controllers is received at the first terminal of another of said plurality of power supply controllers.

3. The system of claim 1, wherein said pulse generator circuit applies a differential synchronization pulse to first and second sync terminals responsive to the voltage at the input of said first comparator exceeding said first threshold level; and
   wherein said first sync terminals of said plurality of power supply controllers are connected in common with one another, and wherein said second sync terminals of said plurality of power supply controllers are connected in common with one another.

4. The system of claim 3, wherein said pulse generator circuit comprises:
   a differential amplifier, having inputs coupled to said first and second sync terminals, and having an output coupled to said input of said first comparator at which a pulse of a voltage higher than said first threshold level is generated responsive to said differential amplifier receiving a differential synchronization pulse at said first and second sync terminals.

5. The system of claim 1, further comprising, for each of said plurality of power supply controllers:
   a first resistor coupled between said first terminal and said capacitor in such a manner that said first resistor is also coupled between said first and second terminals; and
   a discharge circuit, coupled to said second terminal, for discharging the voltage thereat responsive to the output of said second comparator being at said first state.

6. The system of claim 5, further comprising, for each of said plurality of power supply controllers:
   a second resistor coupled between said capacitor and said second terminal.

7. The system of claim 1, further comprising, for each of said plurality of power supply controllers:
   a mask circuit, having an output coupled to a control input of said PWM comparator and having an input coupled to the output of said first comparator, for disabling said PWM comparator responsive to the voltage at the input of said first comparator exceeding said first threshold level.

8. The system of claim 7, wherein said mask circuit also has an input coupled to the output of said second comparator, and is also for enabling said PWM comparator responsive to the voltage at said second terminal falling below said third threshold level.

9. The system of claim 1, further comprising, for each of said plurality of power supply controllers:
   a disable circuit, having an output coupled to a control input of said circuit for generating a pulse width modulated signal, having an input coupled to the output of said first comparator and having an input coupled to the output of said second comparator, for disabling said generating circuit responsive to responsive to the voltage at the input of said first comparator exceeding said first threshold level and for enabling said generator circuit responsive to the voltage at said second terminal exceeding said second threshold level.

10. A power supply controller, comprising:
    a PWM comparator for comparing a feedback signal to a commanded level;
    a circuit for generating a pulse width modulated signal responsive to the output of said PWM comparator, and for applying the same to the output of the power supply controller; and
    an oscillator, comprising:
       a first comparator having an input coupled to a first terminal for receiving a voltage thereat and for generating an output corresponding to the comparison of said voltage with a first threshold level;

a second comparator, having an input coupled to a second terminal for receiving a voltage thereat, and for generating an output corresponding to the comparison of the voltage at its input with second and third threshold levels, said second comparator driving its output to a first state responsive to the voltage at its input exceeding said second threshold level and maintaining said first state until the voltage at its input falls below said third threshold level, said second threshold level being higher than said first threshold level, and said third threshold level being lower than said first threshold level;

a charging circuit for applying a charging current to said first terminal responsive to said first and second comparators in such a manner that said charging circuit is enabled responsive to the voltage at the input of said first comparator exceeding said first threshold level, and is disabled responsive to the output of said second comparator at said first state, for applying a charging current to said first terminal; and a pulse generator circuit having an output coupled to the input of said first comparator, for generating a synchronization pulse responsive to the voltage at said first terminal exceeding said first threshold level.

11. The power supply controller of claim 10, further comprising:
a capacitor coupled to said first and second terminals.

12. The power supply controller of claim 11, further comprising:
a first resistor, connected between said first terminal and said capacitor;
wherein said second terminal is coupled to said capacitor in such a manner that said first resistor is connected between said first and second terminals.

13. The power supply controller of claim 10, further comprising:
a discharge circuit, coupled to said second terminal, for discharging the voltage thereat responsive to the output of said second comparator being at said first state.

14. The power supply controller of claim 13, further comprising:
a capacitor coupled to said first and second terminals;
a first resistor connected between said first terminal and said capacitor; and
wherein said second terminal is coupled to said capacitor in such a manner that said first resistor is connected between said first and second terminals.

15. The power supply controller of claim 14, further comprising:
a second resistor, connected between said capacitor and said second terminal.

16. The power supply controller of claim 10, further comprising:
a mask circuit, having an output coupled to a control input of said PWM comparator and having an input coupled to the output of said first comparator, for disabling said PWM comparator responsive to the voltage at the input of said first comparator exceeding said first threshold level.

17. The power supply controller of claim 16, wherein said mask circuit also has an input coupled to the output of said second comparator, and is also for enabling said PWM comparator responsive to the voltage at said second terminal falling below said third threshold level.

18. The power supply controller of claim 10, wherein said pulse generator circuit applies said synchronization pulse to said first terminal responsive to the voltage at the input of said first comparator exceeding said first threshold level.

19. The power supply controller of claim 10, wherein said pulse generator circuit applies a differential synchronization pulse to first and second sync terminals responsive to the voltage at the input of said first comparator exceeding said first threshold level.

20. The power supply controller of claim 19, wherein said pulse generator circuit comprises:
a differential amplifier, having inputs coupled to said first and second sync terminals, and having an output coupled to said input of said first comparator at which a pulse of a voltage higher than said first threshold level is generated responsive to receiving said differential amplifier receiving a differential synchronization pulse at said first and second sync terminals.

* * * * *